Jan. 19, 1943. J. F. SEBALD 2,308,721
FEEDWATER HEATER
Filed May 20, 1941 2 Sheets-Sheet 1

Joseph F. Sebald
INVENTOR
BY
ATTORNEY

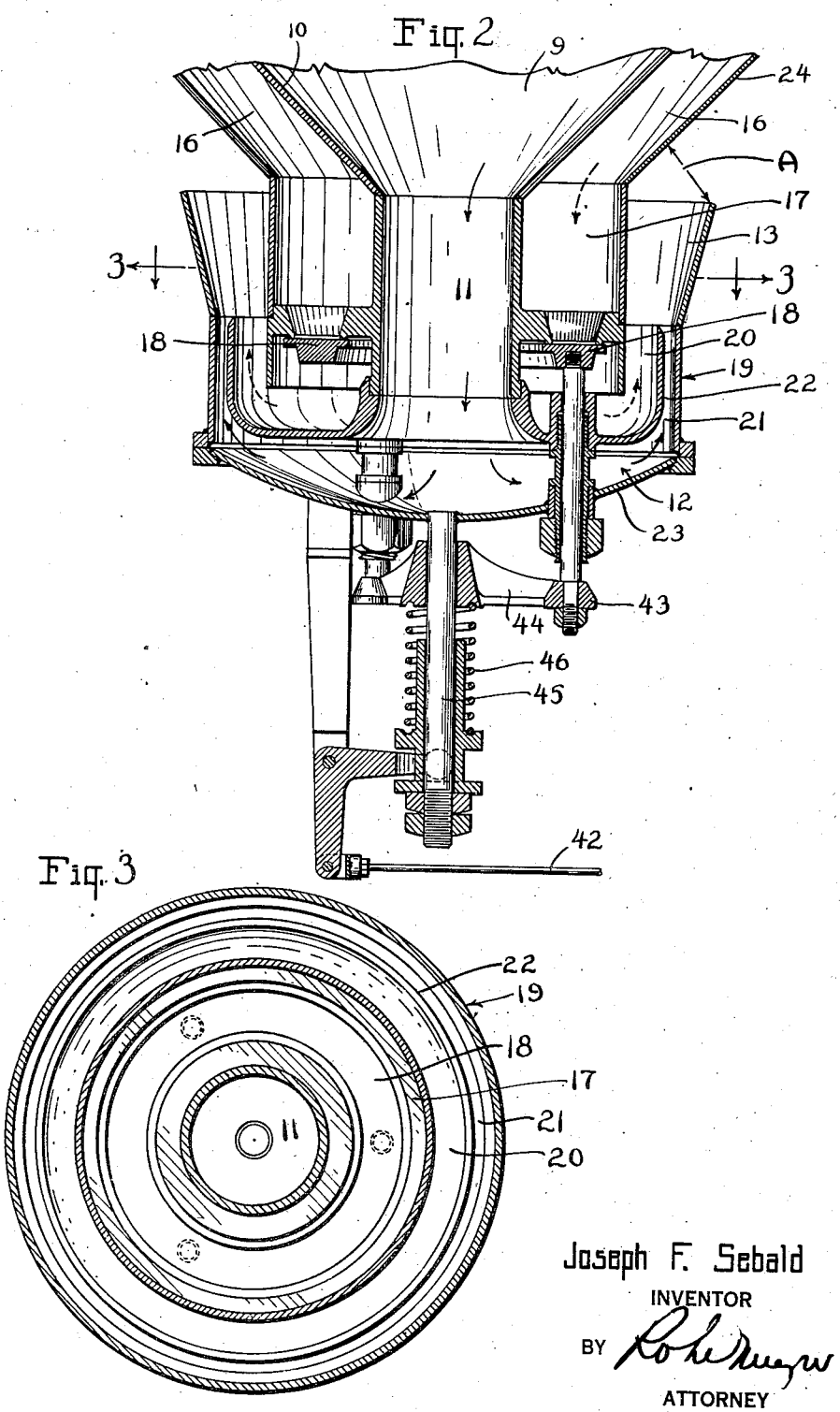

Patented Jan. 19, 1943

2,308,721

UNITED STATES PATENT OFFICE 2,308,721

FEED-WATER HEATER

Joseph F. Sebald, Arlington, N. J., assignor to Worthington Pump and Machinery Corporation, Harrison, N. J., a corporation of Delaware Application May 20, 1941, Serial No. 394,263

12 Claims. (Cl. 261—115)

This invention relates to apparatus for heating and degasifying liquids, and more particularly to an improved apparatus for heating and deaerating water for boiler feed service and other services and purposes requiring practically oxygen free water.

The apparatus of the present invention is of the "mixing" type, as disclosed in the prior application, Serial No. 354,974, in contradistinction to the "atomizing" and "tray" types of water treating apparatus known in the art.

An object of the present invention is the provision of an improved apparatus for heating and degasifying liquids which will provide a maximum heating and deaeration of the water, characterized by the fact that the partially heated and partially deaerated water is brought into intimate contact with the steam and maintained in such contact for a relatively long period of time, as compared with the interval of contact of steam and water in "atomizing" type heaters. During such period of intimate contact, in the present invention, the steam and water are thoroughly mixed and passed through a space in the form of a passage of gradually increasing cross-sectional area from its entrance to its outlet, thereby providing a gradual lowering or reduction of the velocity of flow and increase in pressure to enhance the thorough mixing of the steam and water. Finally, the stream of thoroughly mixed steam and water is projected into an area of lower pressure, and means are provided for breaking up the stream of mixed steam and water upon its projection into the area of lower pressure to enhance reboiling or flashing thereof and result in degasification of the water to a degree approaching actual "zero" oxygen content or degasified condition.

With these and other objects in view, as may appear from the accompanying specification, the invention consists of various features of construction and combination of parts, which will be first described in connection with the accompanying drawings, showing a feedwater heater of the preferred form embodying the invention, and the features forming the invention will be specifically pointed out in the claims.

In the drawings:

Figure 2 is an enlarged view of the apparatus showing the mixing passage for the steam and water, together with the entrance flow controlling structure.

Figure 3 is a cross-section on the line 3—3 of Figure 2.

Figure 1:
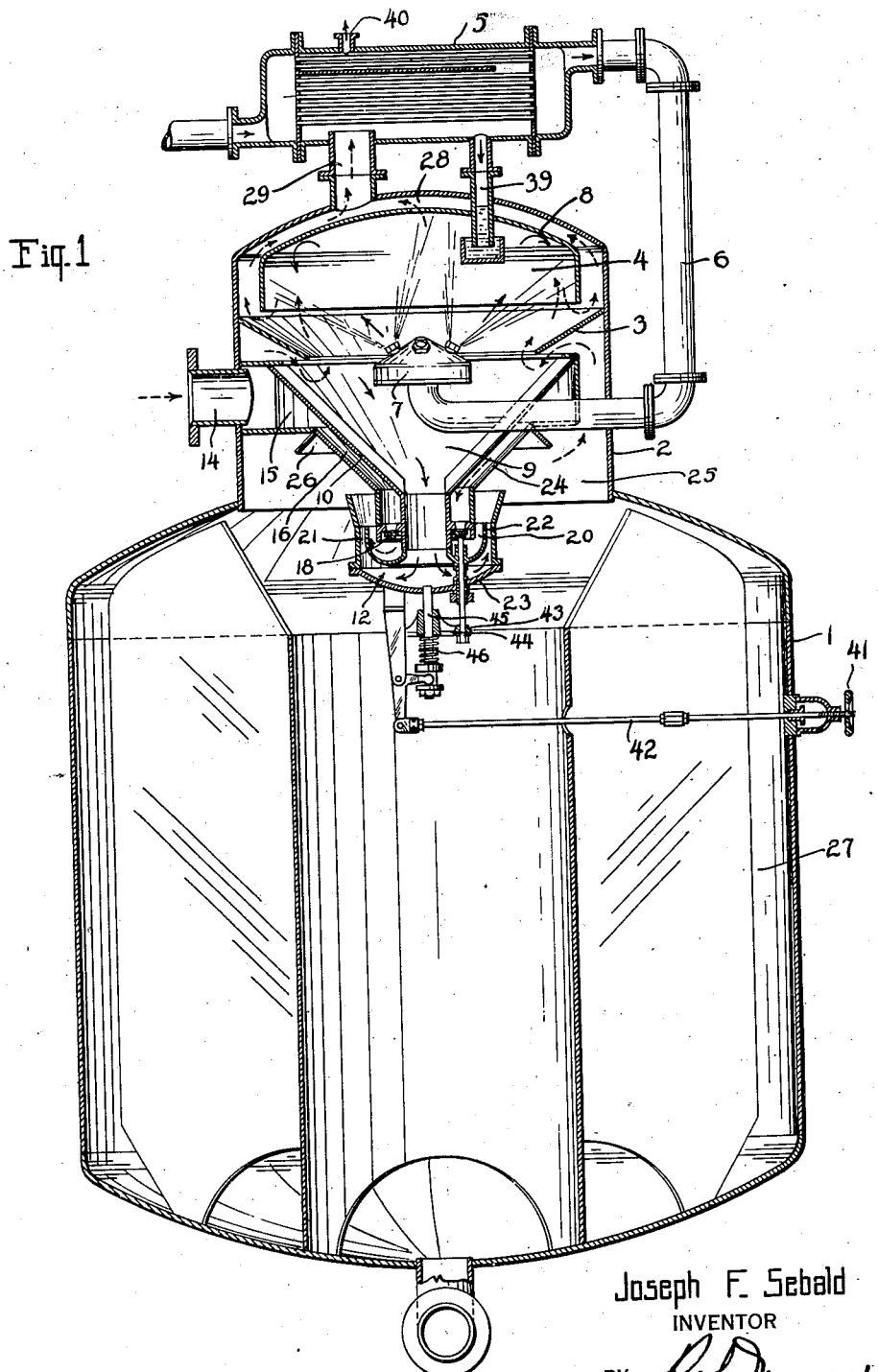
Figure 1 is a vertical section through the improved liquid heating and deaerating apparatus.

Referring more particularly to the drawings, the improved apparatus for heating and deaerating water or other liquids includes the main body tank 1, having the extension 2 formed thereon. The extension 2 has a laterally extending, downwardly inclining partition 3 therein, the center portion of which is open, and which cooperates with the extension 2 of the shell or body 1 to form the initial treating chamber 4, in which the water to be treated is first partially heated and partially deaerated.

In Figure 1 of the drawings a vent condenser 5 is shown, which utilizes the water which is to be treated as a circulating cooling medium for condensing any steam or condensible vapors which are not condensed in the water heating and deaerating apparatus proper, and for cooling the noncondensible gases for reducing their volume prior to withdrawal by suitable air removal apparatus (not shown). While in the construction shown in Figure 1 of the drawings the water to be treated flows through the vent condenser 5 as the circulating cooling medium, and thence to the heating and deaerating apparatus, the water to be treated may be delivered directly to the apparatus, without departing from the spirit of the present invention.

The water to be treated flows through the inlet pipe 6 and is introduced into the initial treating chamber 4 through a spray head 7, of any suitable construction, which sprays the water in relatively thin, divided streams upwardly into the chamber 4. The water thus sprayed into the chamber 4 by the spray head 7 strikes against the inner surface of the dome-like baffle 8, which causes a change in the direction of flow of the water, so that it flows downwardly upon the drain or partition baffle 3. The water sprayed into the initial treatment chamber 4 is partially heated and deaerated by steam which flows into the initial treatment chamber 4 from the final stage of heating and deaeration of the apparatus, as will be hereinafter more fully discussed.

The water flows from the inclined baffle or partition 3 into the water collection space 9, which is formed by the conical member 10. The conical member 10 is in the form of an inverted cone, and its inclined side walls converge into a constricted outlet passage 11.

The outlet passage 11 opens into the entrance structure 12 of the mixing passage 13.

Steam enters the apparatus through the steam inlet pipe 14, flowing into the closed steam chamber or heating jacket 15, which latter, together with its downwardly and inwardly inclining outlet passage 16, completely surrounds the water collection space 9 and maintains the steam and water, at this point of its treatment, in spaced, separated, heat exchange relationship. The steam flows from the steam chamber 15 through the downwardly and inwardly inclining delivery passage 16 into an annular passage 17 formed about the constricted water passage 11. The flow of the steam from the annular passage 17 is controlled by a valve structure 18.

The entrance end 19 of the mixing passage 13 is divided into a steam passage 20 and a water passage 21 by the annular partition 22, which latter is positioned so that the steam passage 20 and the water passage 21 are proportioned relative to each other to regulate the volume of steam and the velocity of water flowing to the mixing passage 13 proportionately to the ultimate temperature of the water desired and the operating conditions of the apparatus.

The water flows from the constricted outlet 11 into the passage 21 through the connecting space formed by the member 23. The steam and water flowing to the entrance of the mixing passage 13 are directed in separated, parallel streams through the passages 20 and 22, so that they enter the mixing passage 13 in parallel flow.

The mixing passage 13 gradually increases in cross-sectional area from its inlet end to its outlet end, and the water and steam flow in an ascending passage therethrough so that the velocity of flow is partially converted into pressure in this mixing passage 13, resulting in a reduction of the velocity and an increase in the pressure of the steam and water passing through the mixing passage, insuring thorough and complete mixing of the steam and water therein. As will be noted, by particular reference to Figure 2 of the drawings, the outlet end of the mixing passage 13 is towards the outer surface of the member 24, which cooperates in forming the steam outlet or delivery passage 16, in such manner that the space through which the mixed steam and water flows, indicated by A in Figure 2, is less than the cross-sectional area of the outlet of the mixing passage 13, and thus a restriction is provided at or slightly beyond the outlet of said mixing passage 13, which results in a slight reconversion of pressure into velocity, facilitating the breaking up of the stream of mixed steam and water as it is projected into the low pressure chamber 25. A downwardly inclining baffle 26 is carried by the member 24, outwardly of the restricted space A, to further facilitate the breaking up of the stream of mixed steam and water.

The discharge of the stream of mixed steam and water into the low pressure treatment chamber 25 will result in a flashing of the mixed stream and very materially facilitate deaeration or degasification of the water.

The water falls from the low pressure treatment chamber 25 into the collection space 27 of the heater, while the steam which is not condensed in this chamber, and which is released from the mixture by the flashing operation, flows upwardly about the steam chamber 15, over the top of the water collection space 9, around the baffle or partition 3, and into the initial treatment chamber 4, as indicated by the dotted arrows in Figure 1 of the drawings. The steam entering the initial treatment chamber 4 partially heats and deaerates the water therein, and such steam, together with released non-condensible gases, passes from this initial treatment chamber 4, about the outer surface of the dome-like baffle 8, through the passage 28 between the baffle 8 and the shell or extension 2, through the outlet 29 and into the vent condenser 5. The vapor or steam passing into the vent condenser 5 is condensed therein and the condensate formed returns to the initial treatment chamber 4 through a suitable water leg 39, while the non-condensible gases pass from the condenser through an outlet 40.

The valve structure 18 is, in the construction shown in the drawings, manually adjusted from the exterior of the apparatus through the medium of a hand wheel 41, rod 42, and suitable linkage and connection members, as shown at 43. The linkage and connection members 43 include a spider 44, which is slideably mounted upon a rod 45, and is urged into valve closing position by a spring 46, the tension of which is regulated by the adjustment of the hand wheel 41. Thus, a yieldable adjusting mechanism is provided for the valve 18 which will hold the valve closed at such times as the pressure of steam in the passage 17 is insufficient to overcome the tension of the spring 46. Consequently, the valve 18 will be opened proportionately to the difference in the pressures exerted by the steam and by the spring 46.

Summing up, the operation of the apparatus is as follows: the water to be treated is sprayed into the initial treatment chamber 4 against the baffle 8, which latter reverses the directional flow of the water and causes it to flow downwardly upon the baffle 3, from which it falls into the collection chamber 9. The water is initially heated and partially deaerated in this initial treatment chamber 4, and it is further heated in the collection space 9 by the steam in the steam chamber or jacket 15 and in the delivery passage 16. During this second stage heating the water and steam are maintained in separated heat exchange relationship. From the collection space 9 and the closed steam chamber 15 the steam and water flow into the respective parallel inlet passages 20 and 21, from which they enter the mixing chamber or passage 13 in parallel, uni-directional flow. The steam and water are thoroughly mixed in the mixing passage 13, and are discharged therefrom into the final treatment chamber 25, which is a low pressure area, where the final stage of heating and deaeration occurs. By regulation of the relative areas of the passages 20 and 21 the quantity of steam and the velocity of the water may be proportionately controlled and regulated to meet the conditions of operation under which the apparatus is to work, and in accordance with the final temperature of the water desired. The quantity of steam delivered to the mixing passage 13 will be controlled and regulated according to the pressure of the steam, by means of the valve structure 18, thus preventing any back-flow of water through the steam passage 16, chamber 15, etc.

It will be understood that the invention is not to be limited to the specific construction or arrangement of parts shown, but that they may be widely modified within the invention defined by the claims.

What is claimed is:

1. In water heating and deaerating apparatus, an initial treatment chamber, means for introducing water into said chamber, a confined mixing passage for steam and water, means for collecting and delivering water to said mixing passage from said initial treatment chamber, a steam chamber, means for delivering steam from said steam chamber to said mixing passage, said steam delivering means surrounding said water collecting and delivering means at least in part to maintain the steam and water in separated heat exchange relationship during their flow to said mixing passage.

2. In water heating and deaerating apparatus, an initial treatment chamber, means for introducing water into said chamber, a confined mixing passage for steam and water, means for collecting and delivering water to said mixing passage from said initial treatment chamber, a steam chamber, means for delivering steam from said steam chamber to said mixing passage, said steam delivering means surrounding said water collecting and delivering means at least in part to maintain the steam and water in separated heat exchange relationship during their flow to said mixing passage, means at the entrance of said mixing passage for directing the steam and water entering said passage in parallel mixing flow relationship, and a stage treating chamber receiving the mixed steam and water from said mixing passage.

3. In water heating and deaerating apparatus, an initial treatment chamber, means for introducing water into said chamber, a confined mixing passage for steam and water, means for collecting and delivering water to said mixing passage from said initial treatment chamber, a steam chamber, means for delivering steam from said steam chamber to said mixing passage, said steam delivering means surrounding said water collecting and delivering means at least in part to maintain the steam and water in separated heat exchange relationship during their flow to said mixing passage, said mixing passage being of gradually increasing cross-sectional area from its inlet to its outlet for converting velocity of flow of mixed water and steam into pressure to insure intimate mixing of the steam and water in the passage.

4. In water heating and deaerating apparatus, an initial treatment chamber, means for introducing water into said chamber, a confined mixing passage for steam and water, means for collecting and delivering water to said mixing passage from said initial treatment chamber, a steam chamber, means for delivering steam from said steam chamber to said mixing passage, said steam delivering means surrounding said water collecting and delivering means at least in part to maintain the steam and water in separated heat exchange relationship during their flow to said mixing passage, said mixing passage being of gradually increasing cross-sectional area from its inlet to its outlet for converting velocity of flow of mixed steam and water into pressure to insure intimate mixing of the steam and water in the passage, said mixing passage constructed and arranged relative to said steam delivery means so that the cross-sectional area of the space immediately outwardly of the outlet of the mixing passage will be reduced with respect to the cross-sectional area of the outlet of said mixing passage.

5. In water heating and deaerating apparatus, an initial treatment chamber, means for introducing water into said chamber, a confined mixing passage for steam and water, means for collecting and delivering water to said mixing passage from said initial treatment chamber, a steam chamber, means for delivering steam from said steam chamber to said mixing passage, said steam delivering means surrounding said water collecting and delivering means at least in part to maintain the steam and water in separated heat exchange relationship during their flow to said mixing passage, said mixing passage being of gradually increasing cross-sectional area from its inlet to its outlet for converting velocity of flow of mixed water and steam into pressure to insure intimate mixing of the steam and water in the passage, said mixing passage constructed and arranged relative to said steam delivery means so that the cross-sectional area of the space immediately outwardly of the outlet of the mixing passage will be reduced with respect to the cross-sectional area of the outlet of said mixing passage, and a deflecting baffle in the path of the mixed water and steam outwardly of said area-reduced space.

6. In water heating and deaerating apparatus, an initial treatment chamber, means for introducing water into said chamber, a confined mixing passage for steam and water, means for collecting and delivering water to said mixing passage from said initial treatment chamber, a steam chamber, means for delivering steam from said steam chamber to said mixing passage, said steam delivering means surrounding said water collecting and delivering means at least in part to maintain the steam and water in separated heat exchange relationship during their flow to said mixing passage, said water introducing means constructed and arranged to project water into said initial treatment chamber in a countercurrent direction to the flow of the water to said mixing passage.

7. In water heating and deaerating apparatus, an initial treatment chamber, means for introducing water into said chamber, a confined mixing passage for steam and water, means for collecting and delivering water to said mixing passage from said initial treatment chamber, a steam chamber, means for delivering steam from said steam chamber to said mixing passage, said steam delivering means surrounding said water collecting and delivering means at least in part to maintain the steam and water in separated heat exchange relationship during their flow to said mixing passage, said mixing passage being of gradually increasing cross-sectional area from its inlet to its outlet for converting velocity of flow of mixed steam and water into pressure to insure intimate mixing of the steam and water in the passage, said mixing passage constructed and arranged relative to said steam delivery means so that the cross-sectional area of the space immediately outwardly of the outlet of the mixing passage will be reduced with respect to the cross-sectional area of the outlet of said mixing passage, and adjustable means for regulating the quantity of steam entering said mixing passage.

8. In water heating and deaerating apparatus, an initial treatment chamber, means for introducing water into said chamber, a confined mixing passage for steam and water, means for collecting water from said initial treatment chamber and delivering it to said mixing passage, a steam chamber, means for delivering steam from said steam chamber to said mixing passage, said steam delivering means surrounding said water collecting and delivering means at least in part to maintain the steam and water in separated heat exchange relationship during their flow to said mixing passage, and means at the entrance of said mixing passage forming separated steam and water passages to the inlet of said mixing passage, said last-named steam and water passages having cross-sectional areas proportioned relative to each other to regulate the volume of steam and the velocity of water flowing to the mixing passage proportionately to the ultimate desired temperature of the water.

9. In water heating and deaerating apparatus, an initial treatment chamber, means for introducing water into said chamber, a confined mixing passage for steam and water, means for collecting water from said initial treatment chamber and delivering it to said mixing passage, a steam chamber, means for delivering steam from said steam chamber to said mixing passage, said steam delivering means surrounding said water collecting and delivering means at least in part to maintain the steam and water in separated heat exchange relationship during their flow to said mixing passage, and means at the entrance of said mixing passage forming separated steam and water passages to the inlet of said mixing passage, said last-named steam and water passages having cross-sectional areas proportioned relative to each other to regulate the volume of steam and the velocity of water flowing to the mixing passage proportionately to the ultimate desired temperature of the water, said means forming said water and steam entrance passages to said mixing passage being constructed and arranged to direct the steam and water entering the mixing passage in spaced apart parallel unidirectional flow.

10. In water heating and deaerating apparatus, an initial treatment chamber, means for introducing water into said chamber, a confined mixing passage for steam and water, means for collecting water from said initial treatment chamber and delivering it to said mixing passage, a steam chamber, means for delivering steam from said steam chamber to said mixing passage, said steam delivering means surrounding said water collecting and delivering means at least in part to maintain the steam and water in separated heat exchange relationship during their flow to said mixing passage, means at the entrance of said mixing passage forming separated steam and water passages to the inlet of said mixing passage, said last-named steam and water passages having cross-sectional areas proportioned relative to each other to regulate the volume of steam and velocity of water flowing to the mixing passage proportionately to the ultimate desired temperature of the water, said means forming said water and steam entrance passages to said mixing passage being constructed and arranged to direct the steam and water entering the mixing passage in spaced apart parallel uni-sectional flow, said mixing passage being of gradually increasing cross-sectional area from its inlet toward its outlet for converting velocity of flow of mixed water and steam into pressure to insure intimate mixing of the steam and water in the passage.

11. In water heating and deaerating apparatus, an initial treatment chamber, means for introducing water into said chamber, a confined mixing passage for steam and water, means for collecting water from said initial treatment chamber and delivering it to said mixing passage, a steam chamber, means for delivering steam from said steam chamber to said mixing passage, said steam delivering means surrounding said water collecting and delivering means at least in part to maintain the steam and water in separated heat exchange relationship during their flow to said mixing passage, means at the entrance of said mixing passage forming separated steam and water passages to the inlet of said mixing passage, said last-named steam and water passages having cross-sectional areas proportioned relative to each other to regulate the volume of steam and velocity of water flowing to the mixing passage proportionately to the ultimate desired temperature of the water, said means forming said water and steam entrance passages to said mixing passage being constructed and arranged to direct the steam and water entering the mixing passage in spaced apart parallel unidirectional flow, said mixing passage being of gradually increasing cross-sectional area from its inlet toward its outlet for converting velocity of flow of mixed water and steam into pressure to insure intimate mixing of the steam and water in the passage, said mixing passage constructed and arranged relative to said steam delivery means so that the cross-sectional area of the space outwardly of the outlet of said mixing passage will be reduced with respect to the cross-sectional area of the outlet of the mixing passage for breaking up the stream of mixed steam and water as it leaves the mixing passage.

12. In a water heating and deaerating apparatus, an initial treatment chamber, means for introducing water into said chamber, a confined mixing passage for steam and water, means for collecting water from said initial treatment chamber and delivering it to said mixing passage, a steam chamber, means for delivering steam from said steam chamber to said mixing passage, said steam delivering means surrounding said water collecting and delivering means at least in part to maintain the steam and water in separated heat exchange relationship during their flow to said mixing passage, means at the entrance of said mixing passage forming separated steam and water passages to the inlet of said mixing passage, said last-named steam and water passages having cross-sectional areas proportioned relative to each other to regulate the volume of steam and velocity of water flowing to the mixing passage proportionately to the ultimate desired temperature of the water, said means forming said water and steam entrance passages to said mixing passage being constructed and arranged to direct the steam and water entering the mixing passage in spaced apart parallel uni-directional flow, said mixing passage being of gradually increasing cross-sectional area from its inlet toward its outlet for converting velocity of flow of mixed water and steam into pressure to insure intimate mixing of the steam and water in the passage, a yieldably mounted valve for controlling the delivery of steam to said mixing passage, means applying tensioning pressure to said valve, and means for regulating the tension of said tensioning pressure applying means.

JOSEPH F. SEBALD.